United States Patent
Kim et al.

(10) Patent No.: US 10,313,338 B2
(45) Date of Patent: Jun. 4, 2019

(54) AUTHENTICATION METHOD AND DEVICE USING A SINGLE-USE PASSWORD INCLUDING BIOMETRIC IMAGE INFORMATION

(75) Inventors: Dae-hoon Kim, Seoul (KR); Hyeong-in Choi, Seoul (KR); Tuyen Nguyen, Seoul (KR); Dung Pham, Seoul (KR)

(73) Assignee: IRITECH, INC., Fairfax, VA (US)

( * ) Notice: Subject to any disclaimer, the term of this patent is extended or adjusted under 35 U.S.C. 154(b) by 0 days.

(21) Appl. No.: 14/233,140

(22) PCT Filed: Aug. 23, 2011

(86) PCT No.: PCT/KR2011/006212
§ 371 (c)(1),
(2), (4) Date: May 12, 2014

(87) PCT Pub. No.: WO2013/012120
PCT Pub. Date: Jan. 24, 2013

(65) Prior Publication Data
US 2014/0250517 A1    Sep. 4, 2014

(30) Foreign Application Priority Data
Jul. 15, 2011 (KR) .................. 10-2011-0070402

(51) Int. Cl.
*H04L 29/06* (2006.01)
*H04K 1/00* (2006.01)
(Continued)

(52) U.S. Cl.
CPC ...... *H04L 63/0861* (2013.01); *G06K 9/00617* (2013.01); *G06K 9/00885* (2013.01);
(Continued)

(58) Field of Classification Search
CPC ....... H04L 9/32–9/3297; H04L 63/06–63/068; H04L 63/08–63/0892;
(Continued)

(56) References Cited

U.S. PATENT DOCUMENTS

2002/0095507 A1* 7/2002 Jerdonek ............... H04L 9/3271
                                                              709/229
2003/0126400 A1* 7/2003 Debiez ..................... G06F 21/64
                                                              711/216
(Continued)

FOREIGN PATENT DOCUMENTS

| KR | 10-2002-0033996 A | 5/2002 |
| KR | 10-2011-0005616 A | 1/2011 |
| KR | 10-2011-0055112 A | 5/2011 |

OTHER PUBLICATIONS

PCT International Search Report for PCT Counterpart Application No. PCT/KR2011/006212, 5 pgs., (dated May 30, 2012).

*Primary Examiner* — Ashokkumar B Patel
*Assistant Examiner* — Quazi Farooqui
(74) *Attorney, Agent, or Firm* — Womble Bond Dickinson (US) LLP

(57) ABSTRACT

The present invention relates to an authentication method and device using a single-use password generated from iris image information. The device comprises: a terminal and a server storing, in respective memories thereof, the iris image information for authentication; a camera attached to and installed on the device to capture the iris image information for authentication; the terminal, which generates the single-use password from the iris image information acquired through the camera, and transmits the single-use password to the server; and the server, which has a built-in algorithm for comparing and determining whether or not the single-use
(Continued)

password transmitted from the terminal matches single-use password stored in the server.

21 Claims, 2 Drawing Sheets

(51) Int. Cl.
*G06K 9/00* (2006.01)
*H04L 9/32* (2006.01)

(52) U.S. Cl.
CPC .......... *H04L 9/3228* (2013.01); *H04L 9/3231* (2013.01); *H04L 63/083* (2013.01); *G06K 2009/00953* (2013.01)

(58) Field of Classification Search
CPC . H04L 63/0861; H04L 63/083; H04L 9/3228; H04L 9/3231; H04L 29/06; G06F 21/30–21/46; G06K 9/00617; G06K 9/00885; G06K 2009/00953; G06K 9/00; H04K 1/00
USPC ...................................... 726/7; 713/186, 200
See application file for complete search history.

(56) References Cited

U.S. PATENT DOCUMENTS

| | | | |
|---|---|---|---|
| 2003/0126448 A1* | 7/2003 | Russo ................ | G06K 9/00026 713/186 |
| 2003/0152254 A1* | 8/2003 | Ha .......................... | G06F 21/32 382/124 |
| 2004/0129787 A1* | 7/2004 | Saito ..................... | G06K 19/07 235/492 |
| 2011/0145899 A1* | 6/2011 | Cao ....................... | H04L 9/3213 726/7 |

* cited by examiner

AUTHENTICATION METHOD AND DEVICE USING A SINGLE-USE PASSWORD INCLUDING BIOMETRIC IMAGE INFORMATION

CROSS-REFERENCE TO RELATED APPLICATIONS

This patent application is a U.S. National Phase Application under 35 U.S.C. § 371 of International Application No. PCT/KR2011/006212, filed Aug. 23, 2011, entitled AUTHENTICATION METHOD AND DEVICE USING A SINGLE-USE PASSWORD INCLUDING BIOMETRIC IMAGE INFORMATION, which claims priority to Korean Patent Application No. 10-2011-0070402, filed Jul. 15, 2011.

The present invention relates to an authentication method and device using a single-use password generated from iris image information, which includes: a terminal and a server storing iris image information for authentication in each memory thereof; and a camera attached to the device to photograph and acquire the iris image information for authentication, wherein the terminal generates a single-use password from the iris image information acquired through the camera and transmits the single-use password to the server; and the server has an embedded algorithm for comparing and determining whether the single-use password transmitted from the terminal matches the single-use password stored in the server.

If a server requests biometric information of a user for authentication, the user employs his/her biometric information as a personal identification factor (i.e., a biometric password) to access the server.

If a password in the form of plain text is leaked, a user can use a new password issued from the server. However, if biometric information used as a password is leaked, it is difficult to issue a new one. This is because biometric information is a unique characteristic of a user; therefore a biometric password cannot be reissued unless a biometric characteristic of the user is changed.

In a conventional method of generating a single-use password, the single-use password is generated from a seed through a proper generator. Leakage of the seed and generator means that all single-use passwords to be used will be leaked in the future. Therefore, the seed must be immediately discarded after generating the single-use password, and it is desirable to generate a new single-use password while periodically changing the seed. When a new seed is used to generate a single-use password, both (i.e., a user and a server) have to use this seed at approximately the same time. However, there is a problem in that separate secure communication is required between the user and the server upon each occasion.

SUMMARY

An aspect of the present invention is to perform authentication by combining biometric information and a single-use password, in which the biometric information is first used to authenticate a user and then a user's single-use password is used to perform further authentication on server, wherein the biometric information is used as variables of a hash function, thereby improving reliability and stability of authentication.

Another aspect of the present invention is to improve reliability through user's safety authentication by using a user biometric image captured at a certain time point as a seed to generate a chain of single-use passwords, and by frequently updating the chain of single-use passwords based on biometric images photographed by the camera at different time points when a user is authenticated by the server.

A further aspect of the present invention is to reduce a memory space in a server while enhancing transmission and processing speed upon authentication by comparing partial or processed data, which is smaller than the original biometric image, with a biometric image template stored in the server by taking into consideration that the biometric image photographed for authentication by a camera occupies a large memory space and is thus slowly processed when used for authentication.

Yet another aspect of the present invention is to achieve significant improvement of security by physically separating a smart card carried by a user, a camera for photographing or reading a biometric image, and a card reader from one another, and storing a hash function which uses biometric images as variables in the smart card, such that the smart card can be inserted into the card reader and communicate with the server for authentication, as needed.

In accordance with one aspect of the present invention, an authentication method using a single-use password generated from iris image information includes: storing iris image information for authentication in memories of a terminal and a server, respectively; photographing and acquiring iris image information using a camera attached to the terminal for authentication; generating a single-use password from the iris image information acquired through the camera; transmitting the single-use password generated in the terminal to the server; and determining whether the single-use password transmitted from the terminal matches the single-use password in the server using an matching algorithm embedded in the server.

In accordance with another aspect of the present invention, an authentication device using a single-use password generated from iris image information includes: a terminal and a server storing iris image information for authentication in respective memories thereof; a camera attached to the device to photograph iris image information for authentication; the terminal generating a single-use password from the iris image information acquired through the camera and transmitting the single-use password to the server; and the server which has an embedded algorithm for determining whether the single-use password transmitted from the terminal matches the single-use password stored in the server.

In accordance with a further aspect of the present invention, an authentication method and device using a single-use password generated from iris image information employ a biometric image including an iris, a terminal identification (ID), etc. as a variable of a hash function to improve security while generating the single-use password, in which, in the hash data chain of the hash function, the n-th hash data $H\_n$ is stored in a memory of a server, and the other n−1 hash data are stored in a memory of a terminal, thereby improving safety and reliability of security.

In accordance with yet another aspect of the present invention, there are provided an authentication method and device which uses a single-use password generated from iris image information, in which both terminal and server update the existing hash data in case that the single-use passwords are matched and approved; and the update is performed whenever the approval is given, or limited by presetting an updating frequency in consideration of a burden in the terminal and the server, thereby improving safety and reliability of security.

In accordance with yet another aspect of the present invention, there are provided an authentication method and device using a single-use password generated from iris image information, in which an iris image template obtained by applying Fourier transform or wavelet transform to the iris image is used in order to enhance a processing speed upon authentication while reducing, an occupied memory space.

In accordance with yet another aspect of the present invention, an authentication device using a single-use password generated from iris image information comprises: a smart card which stores single-use passwords generated from iris images for authentication; a server which stores iris image information for authentication in a memory; and a support which is provided with a camera for photographing iris information for authentication and with a smart card reader, the server having an embedded algorithm for determining whether a single-use password transmitted from the support matches the single-use password stored in the server.

According to the present invention, authentication is performed by combining biometric information and a single-use password, in which the biometric information is first used to authenticate a user and then a user's single-use password is used to perform authentication, the biometric information being used as variables of a hash function, thereby improving reliability and stability of authentication.

According to the present invention, a single-use password first used for authentication is generated from a biometric image of a user captured at a certain time point and is updated based on a biometric image acquired through a camera when the user is authenticated by the server, thereby improving reliability and stability through user's safety authentication.

According to the present invention, partial or processed data smaller than an original biometric image is compared with a biometric image template stored in the server by taking into consideration that the whole biometric image photographed for authentication by the camera occupies a large memory space and is thus slowly processed when used for authentication, thereby reducing the occupied memory space of the server while enhancing a processing speed upon authentication.

According to the present invention, a smart card carried by a user, the camera for photographing or reading the biometric image, and a card reader are physically separated, and a hash function using the biometric images as variables is stored in the smart card such that the smart card can be inserted into the card reader and communicate with the server for authentication as needed, thereby significantly improving security.

DETAILED DESCRIPTION

Figure 1:
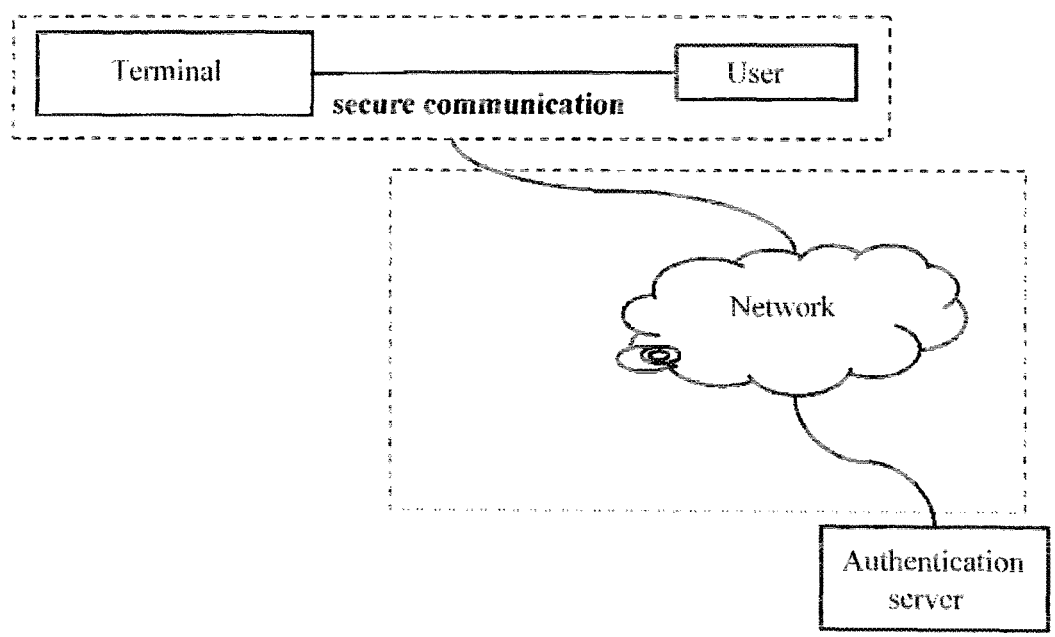
FIG. 1 is a schematic view of an authentication device based on a single-use password with security according to the present invention.

Embodiments of the present invention provide an authentication method using a single-use password generated from iris image information, including: storing iris image information for authentication in memories of a terminal and a server, respectively; photographing and acquiring iris image information using a camera attached to the terminal for authentication generating a single-use password from the iris image information acquired through the camera; transmitting the single-use password generated in the terminal to the server, and determining whether the single-use password transmitted from the terminal matches the single-use password in the server using an matching algorithm embedded in the server.

Exemplary embodiments of the present invention will be described with reference to the accompanying drawings. According to the present invention, proper identifications (IDs) are given to user terminals, respectively. For secure communication with an authentication server, a pair of public and private keys is generated in each of the terminal and the server.

In general, the public key and the private key refer to keys used in a public key infrastructure (PKI).

The public key PU_DEVICE of the terminal and the private key PR_SERVER of the server are stored in the server, and the public key PU_SERVER of the server and the private key PR_DEVICE of the terminal are stored in the terminal. Both generation and storage of the pair of keys are performed under a secure environment.

User biometric information to be registered for authentication by the server, i.e., a biometric image template, is also registered under a physically-isolated secure environment. An authorized operator photographs and captures the user biometric image through a camera, generates the biometric image template from the biometric image, and stores the generated biometric image template in the terminal and the server.

Next, generation of a hash chain to be used as single-use passwords according to the present invention will be described.

An operator or a user employs the camera or a camera attached to a user terminal to capture another biometric image from a registered user. The captured biometric image or a derivative thereof (to be described later) is used as a seed for generating single-use passwords for a corresponding user.

The generated seed and an appropriate hash function are used to produce a chain of hash data. That is, let the photographed image data or a derivative thereof be M, and the hash function be h. Then, a chain of n hash data is generated as shown in the following function (1).

In the hash data chain according to the present invention, a variable of the hash function h is set with the image data or a derivative thereof, thereby remarkably improving safety and reliability in security of the generated single-use passwords.

$$h(M) \text{->} h(h(M)) \text{->} h(h(h(M))) \text{->} \cdots \text{->} h(h(h(M))) \qquad (1),$$

wherein each hash data is data obtained by applying the hash function to the next left hash data (which will be sequentially referred to as H_1, H_2, H_n from the front). In the terminal of every user, such a chain of hash data is generated.

The hash function may employ any one of MD5, SHA1, SHA2 and the like generally known in the art. Here, the hash function has to easily generate the hash data from original data, but be computationally infeasible to guess the original data from the hash data.

Figure 2:
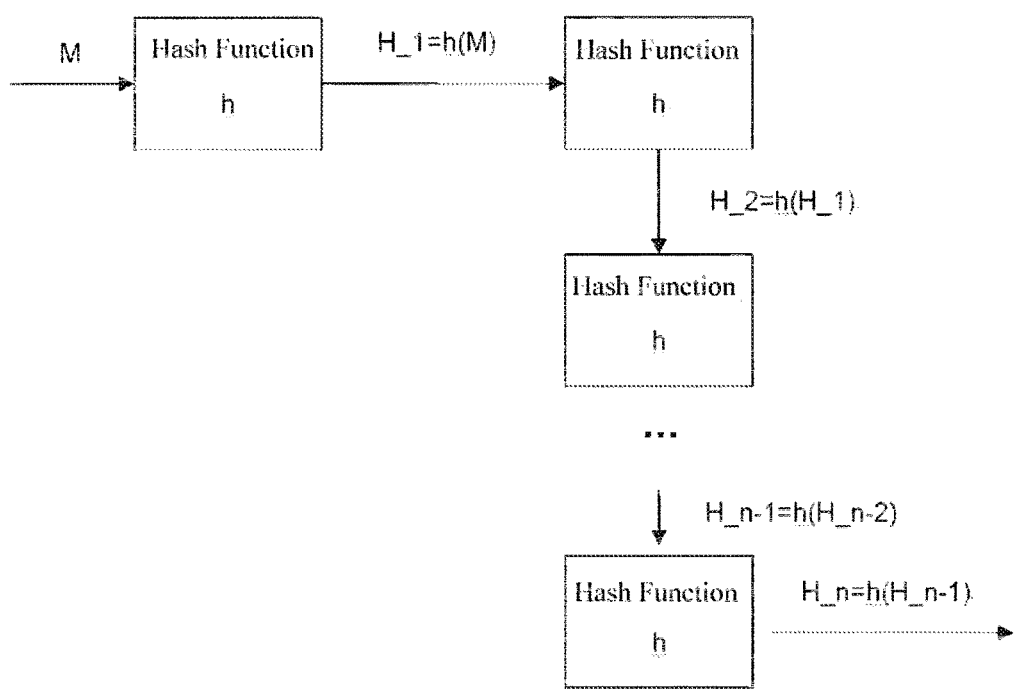
FIG. 2 shows a structure of a hash data chain according to the present invention.
Figure 3:
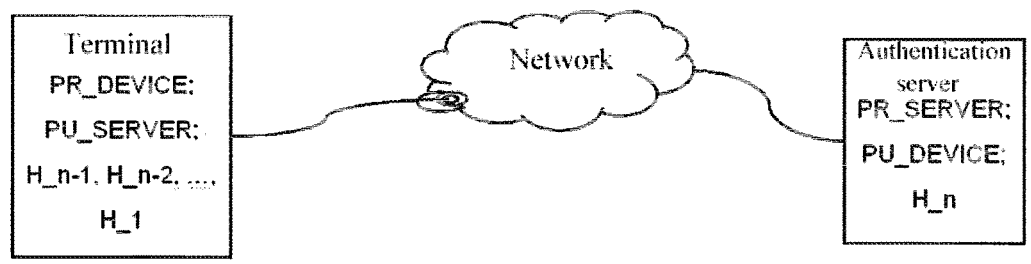
FIG. 3 shows that a terminal and a server store different hash data to improve security according to the present invention.

FIG. 2 is a flowchart of generating a hash function using a biometric image as a variable according to the present invention.

In the hash data chain shown in FIG. 2, it is almost impossible to guess H_1 from H_2, and it is also almost impossible to guess H_2 and H_1 from H_3.

The biometric image may include any image that contains unique user information photographed by the camera, like a fingerprint as well as the iris.

The terminal may include a typical cellular phone, a smartphone, a personal digital assistant (PDA), a tablet personal computer (PC), and various similar computers, so long as the terminal includes a camera and performs communication for authentication with a server.

The server serves to perform authentication based on the terminal ID and the single-use password including a biometric image or a biometric template, a hash function obtained from the terminal.

The captured biometric image occupies a large memory space for storage, and thus it may take much time for the terminal or the server to generate a long hash.

In particular, if the terminal has a poor computational performance, much time and memory space may be required to generate the hash data chain that is a function of the iris image or similar biometric image. Besides, during the updating of new hash chain (to be described later), transmission of the whole biometric image or biometric template between the terminal and the server costs more time.

To solve this problem, instead of the captured biometric image, the following data obtained (derived) from the captured biometric image may be used as the seed.

First, data obtained from iris image pixels in a certain region which includes a characteristic of a user may be used as the seed. For example, the iris image including a user's biometric characteristic is divided into four parts, and one of the four parts is used as the seed. Alternatively, the iris image including a user characteristic may be divided into a plurality of rows or columns, and the iris image pixels corresponding to certain rows and columns may be selected and used as the seed.

Second, the iris image template generated from the biometric image may be used as the seed. The iris image template is a much smaller binary data structure that contains valuable iris features extracted from an iris image. These features are compressed and encoded into a compact size which accelerates the matching process and make it efficient in transmission, storage, and processing. Iris image templates are used to perform iris comparison to determine matching between the iris images.

For example, if the iris image occupies about 100 Kbyte of the memory, the iris image template corresponding to the iris image occupies about 10 Kbyte, which is about 1/10 of the original image data.

This means that the iris image template is significantly reduced as compared with the original image data. To obtain the biometric image template from the biometric image including the captured iris, Fourier transform or wavelet transform may be performed. Details of this are disclosed in the prior patent application of the present applicant, and thus detailed descriptions thereof will be omitted.

As shown in Expression (1), the photographed original image is completely deleted after generating the hash data chain, meaning that the seed used for generating hash data chain is completely dismissed, thereby improving safety and reliability of security. Through this deletion procedure, no one can guess the original image from one hash data of the hash data chain.

According to the present invention, it is important to appropriately distribute the hash data to the terminal and the server and store the same in respective memories so as to prevent hacking during authentication.

In the hash data chain of the hash function, n-th hash data H_n is stored in the memory of the server, and the other n−1 hash data are stored in the memory of the terminal. In the hash data chain of the hash function (1), if the hash data chain is divided and stored in the terminal and the server, the nature of the hash function makes it impossible to guess the hash data previous to H_n even through the server is hacked by a hacker and thus H_n is leaked, thereby preventing the single-use password from being leaked and thus improving safety and reliability of authentication.

Authentication according to the present invention includes two steps. In the first step, the terminal determines whether a user is an actual owner, and the server finishes authentication.

For security, authentication performed between a user and the terminal is as fellows. The user captures a biometric image through the terminal in order to prove that the user is an actual owner who has authority to use the terminal. The terminal compares the captured biometric image or biometric image template with the biometric image or biometric image template registered to and stored in memory.

If it is determined that the two biometric images or biometric image templates are identical to each other or the determination is within a preset range, a user is regarded as an owner who has authority to use the terminal. Otherwise, authority is not given to the user.

To determine whether a user is an owner of the terminal, only a user's personal identification number (PIN) may be input to the terminal (or a PC client connected to the terminal). To enhance security, both the personal identification number and the biometric image may be input (or photographed) such that they can be respectively compared with the personal identification number and the biometric image previously stored in the terminal, and it is determined that a user is an owner of the terminal only when both are matched. The personal identification number (PIN) is different from a single-use password in that it may be used multiple times while a single-use password is dismissed right after used.

When it is determined that a user is an actual owner who has authority to use the terminal, the user performs an authentication procedure such that the corresponding terminal can be authorized by the server to obtain resource access to the server. Such an authentication procedure is performed under secured communication where encoded data is transmitted and received between the server and the terminal.

According to the present invention, the biometric image information including the iris is used to undergo the secured authentication procedure during authentication between the server and the terminal, and thus the step of determining whether a user is an actual owner who has authority to use the terminal may be omitted as needed.

According to the present invention, the terminal is configured to select one hash data among n−1 hash data H_1, H_2, H_n−1 about the corresponding user, stored in the registering step, randomly or in preset order by execution of an embedded program of the terminal.

The selected hash data is a user's single-use password that is disposable. If i-th hash data H_i is transmitted as the single-use password to the server, the hash data subsequent to H_i, i.e., H_j (j>i) is not used any more. The reason is because a third party can guess H_j from H_i if he/she steals H_i.

Accordingly, when H_i is used as a password, the hash data previous to H_i, i.e., H_k (k<i) can be used as the next password. This is an S/Key scheme and, according to the present invention, the biometric image information is used as a variable of the hash image function in order to improve safety and reliability of authentication.

The terminal combines the biometric image information or image template, data H_i generated by the hash function, the terminal ID, etc., and transmits the same to the server in order to perform authentication If the terminal has already determined that the user is an owner based on the biometric image and the hash data is not updated in both the terminal and the server, there is no need to transmit the biometric image information or the biometric image template to the server.

Among three, i.e., the biometric image information or biometric image template, the hash data H_i generated by the hash function, and the terminal ID, at least one of combinations including the hash data H_i will be called "authentication data D". The step of generating the single-use password and transmitting the same from the terminal to the server is as follows.

a) The authentication data D corresponding to the single-use password from the terminal is first signed by the device private key (PR_DEVICE) to generated the signed authentication data D (Sign(D, PR_DEVICE))

b) A symmetric key (e.g., AES) is generated randomly.

c) The generated symmetric key in (b) is used to encode the signed authentication data D generated in (a). (ED=AES(Sign(D, PR_DEVICE)))

d) The symmetric key in (b) (AES) is encoded with the public key (=PU_SERVER) of the server. (PU_SERVER(AES))

e) The singed and encoded authentication data ED and the encoded symmetric key PU_SERVER(AES) are transmitted to the server.

Here, a user's personal identification number (PEN) may be added to the authentication data D.

The server decodes the encoded authentication data(ED) and the encoded symmetric key PU_SERVER(AES) received from the terminal through the following steps.

a) The server uses the private key stored therein to decode the symmetric key PU_SERVER(AES). (PR_SERVER(PU_SERVER(AES))->AES)

b) The decoded symmetric key AES is used to decode the encoded authentication data ED. (AES(ED)->Sign(D, PR_DEVICE))

c) The public key of the terminal is used to verily the origin and integrity of authentication data D.

The server applies the hash function h stored therein to H_i so as to determine whether the decoded hash data H_i is a user's single-use password.

If the hash data identical to H_n stored in the server is acquired by applying the hash function h at least once, it is determined that H_i is a user's single-use password, thereby approving access. That is, it is determined that the authentication is approved.

However, if there is no matching with H_n stored in the server even though the hash function is applied on H_i within a predetermined number of times, it is determined that H_i is not the user's single-use password at this time point and thus resource access is denied.

If the captured biometric image is not compared in the user terminal, the server additionally performs the step of comparing and determining whether the captured biometric image transmitted from the terminal matches a user biometric image and thus determines whether to authorize resource access. To enhance security, even though the procedure of comparing the biometric image is performed in the user terminal, the same procedure may be performed once more in the server.

If access is authorized, there is opportunity to update the existing hash data of both the terminal and the server with another one.

Whenever access is authorized, both the terminal and the server can update the hash data. However, if the terminal tries to perform high frequency authentication, the number of times for updating the hash data increases and may thus be burdensome for both. Accordingly, the update frequency may be limited by a setting value.

Further, a maintenance period of the hash data may be set, and the hash data is updated if user access is authorized after the period expires, thereby improving safety and reliability of security. Here, update is automatically achieved regardless of a user's intention.

To update the existing hash data chain with a new hash data chain, the biometric image transmitted to the server for authorizing access in the terminal may be employed as the seed, thereby allowing both to generate the hash data chain.

The biometric image photographed for authentication by the camera attached to the terminal, maintains unique user biometric characteristic but varies in its pixel values in accordance with a photographing angles and positions. Therefore, the hash data chain generated by this biometric image is also different from the existing hash data chain, thereby improving safety and reliability of security.

If the terminal and the server have different hash data chains, the terminal cannot be authenticated by the server. Thus, the hash data chain is simultaneously updated in both the terminal and the server. Although update in one of the terminal and the server is a little delayed, both the terminal and the server are configured to have the same hash data until the terminal is next authorized.

With the foregoing configurations, the authentication method using a single-use password generated from iris image information according to the present invention will be described according to the steps.

The authentication method using a single-use password generated from iris image information according to the present invention includes: storing iris image information for authentication in memories of a terminal and a server, respectively; acquiring iris image information acquired through a camera attached to the terminal for authentication; generating a single-use password from the iris image information acquired through the camera; transmitting the single-use password generated in the terminal to the server; and determining whether the single-use password transmitted from the terminal matches the single-use password in the server using an matching algorithm embedded in the server.

With the foregoing configurations, the authentication device using a single-use password generated from iris image information according to the present invention will be described.

The authentication device using a single-use password generated from iris image information according to the present invention includes a terminal and a server storing iris image information for authentication in respective memories thereof; a camera attached to the device to photograph iris image information for authentication, in which the terminal generates a single-use password from the iris image information acquired through the camera and transmitting the single-use password to the server, and the server includes an embedded algorithm for determining whether the single-use password transmitted from the terminal matches the single-use password stored in the server.

In the authentication method and device employing a single-use password generated from iris image information according to the present invention, the single-use password may include at least one of combinations including the hash data generated by the hash function alone or the hash data combined with iris image information and/or the terminal ID.

In addition, the hash function is employed to generate the single-use password, in which the iris image is used as a variable of the hash function, thereby improving security and reliability.

In the authentication method and device using a single-use password generated from iris image information according to the present invention, the iris image template obtained by applying Fourier transform or wavelet transform to the iris image may be used instead of the iris image to enhance the processing speed of authentication and to reduce the memory capacity needed for the storage. In addition, in the hash data chain of the hash function, the n-th hash data $H\_n$ may be stored in the memory of the server, and the other $n-1$ hash data may be stored in the memory of the terminal.

The hash function is configured to completely delete the photographed original image after generating the hash data chain using the iris image as the variable of the hash function in order to improve safety and reliability of security.

In the iris image, data obtained from iris image pixels in a certain region which includes biometric characteristic of a user may be used as the seed for generating the single-use password instead of the whole original biometric image. The terminal may additionally include the element for determining whether a user is an owner of the terminal by comparing the iris image of that user photographed by the camera mounted to the terminal with the iris image stored in the terminal.

The server determines that the hash data $H\_i$ (of the hash chain) transmitted from the terminal matches, a user's single-use password when the hash function stored in the server after being applied to $H\_i$ at least once produces a hash data identical to $H\_n$ stored in the server.

In the authentication method using a single-use password generated from iris image information, both the terminal and the server update the existing hash chain in case that the single-use passwords match and are approved. Update may be performed whenever the server gives approval, or limited by presetting the update frequency in consideration of a burden in both the terminal and the server.

<Second Embodiment>

In addition to the functions and means of the server according to the first embodiment, the second embodiment migrates the functions and means from the terminal in the first embodiment to a smart card, except for the camera for photographing an iris image or the biometric scanner for reading a biometric image, the card reader and the input pad, thereby more improving security.

The smart card separated from the terminal of the first embodiment stores at least one combination which always includes a hash data chain among a biometric image or a biometric template, the hash data chain, and a support ID.

In the second embodiment, a device separated from the smart card and provided with a camera for photographing a biometric image or a biometric image reader for reading a biometric image, a card reader and an input pad will be called a 'support'.

To improve authentication security, as in the first embodiment, in the hash data chain of the hash function, the n-th hash data $H\_n$ is stored in a memory of the server, and the other $n-1$ hash data are stored in a memory of the smart card.

In addition, the smart card includes an embedded memory and an embedded microprocessor to implement a predetermined program and generate single-use passwords by using a biometric image as a variable of the hash function.

As in the first embodiment, each hash data in the hash data chain stored in smart card may be used as a single-use password and transmitted to the server for authentication, thereby improving security.

In the smart card, the memory stores an encoding program so that the biometric image, single-use password and support ID used for authentication can be encoded to improve security when they are transmitted to the server.

The hash function may be configured to completely delete the captured iris image used as a seed to generate the hash data chain, thereby improving safety and reliability of security.

In the iris image, data obtained from iris image pixels in a certain region which includes biometric characteristic of a user may be used as the seed for generating the single-use passwords instead of the whole original biometric image. The smart card may additionally include an element for determining whether the user is an owner of the smart card by comparing the iris image of the user photographed by the camera attached to the support with the iris image stored in the smart card.

To improve security of the authentication device using single-use passwords generated from iris image information, a single-use password is encoded before being transmitted to the server and the server in turn decodes the encoded single-use password before performing the matching.

The server determines that the hash data $H\_i$ (of the hash chain) transmitted from the smart card matches a user's single-use password when the hash function stored in the server after being applied to $H\_i$ at least once produces a hash data identical to $H\_n$ stored in the server.

INDUSTRIAL APPLICABILITY

The present invention is highly industrially applicable since security and reliability are improved by an authentication method and device using a single-use password generated from iris image information, which includes: a terminal and a server storing iris image information for authentication in each memory thereof; a camera attached to the device to photograph and acquire the iris image information for authentication, wherein the terminal generates a single-use password from the iris image information acquired through the camera and transmits the single-use password to the server; and the server has an embedded algorithm for comparing and determining whether the single-use password transmitted from the terminal matches the single-use password stored in the server.

What is claimed is:

1. An authentication method using a single-use password generated from iris image information, comprising:
    registering and storing iris image information for authentication in memories of a terminal and a server, respectively;
    generating a plurality of single-use passwords using a hash function, wherein a portion of the iris image information relevant to a biometric characteristic of the user is used to seed the hash function when generating the plurality of single-use passwords;
    storing at least one single-use password in the memories of the terminal and the server, respectively, wherein the single-use password comprises data generated by the hash function, and wherein in a hash data chain of the hash function, a n-th hash data H_n is stored in the memory of the server and another n−1 hash data are stored in the memory of the terminal;

after generating the hash data chain, the hash function deletes the iris image information used as a variable to seed the hash function from the memories of the terminal and the server;

photographing and acquiring a second iris image information for authentication using a camera attached to the terminal;

transmitting a single-use password comprising the i-th hash data in the hash data chain stored in the terminal to the server;

performing authentication by determining whether the single-use password transmitted from the terminal matches the single-use password stored in the server which has an embedded algorithm for matching between single-use passwords; and deleting hash data following the i-th hash data in the hash data chain from the memory of the terminal to prevent the deleted hash data from being used as a single-use password in a future authentication, and wherein hash data that precedes the i-th hash data in the hash data chain is maintained within the memory of the terminal for subsequent use as another single-use password.

2. The authentication method according to claim 1, wherein Fourier transformation or wavelet transformation are applied to generate an iris image template from the iris image information, and wherein the iris image template is used as the seed to the hash function.

3. The authentication method according to claim 1, wherein a whole iris image is not used as the seed image but only those pixels in a certain sub-region of the iris image information which includes the biometric characteristic of the user.

4. The authentication method according to claim 1, further comprising:

encoding the single-use password; and decoding the encoded single-use password at the server.

5. The authentication method according to claim 1, wherein, to determine whether a hash data H_i transmitted from the terminal is a user's single-use password, the server applies at least once the hash function to H_i; when the result hash data of the hash function matches H_n stored in the server, the server determines that H_i is a user's single-use password.

6. The authentication method according to claim 5, wherein both the terminal and the server update the existing hash data when the single-use passwords are matched with each other and approval is given; and updating is performed whenever approval is given, or limited by a preset update frequency in consideration of a burden on the terminal and the server.

7. The authentication method according to claim 6, wherein the hash data is updated based on the iris second image information photographed for authentication.

8. The authentication method according to claim 1, wherein the second iris image information and terminal identification (ID) are further added to data transmitted for authentication from the terminal to the server.

9. An authentication device using a single-use password, comprising:

a camera attached to the device to photograph and acquire iris image information for authentication, a terminal that stores the iris image information for authentication in memory, generates a plurality of single-use passwords, captures a second iris image information through the camera and transmits a single-use password comprising an i-th hash data in a hash data chain to the server, wherein the single-use password comprises at least data generated by a hash function and optionally one of the combinations of the second iris image information and terminal identification (ID), and wherein a portion of the iris image information relevant to a biometric characteristic of a user is used to seed the hash function when generating the plurality of single-use passwords;

a server that stores the iris image information for authentication in memory and has an embedded algorithm for comparing and determining whether the single-use password transmitted from the terminal matches the single-use password stored in the server, wherein in the hash data chain generated with the hash function, a n-th hash data H_n is stored in the memory of the server and another n−1 hash data from the hash data chain are stored in the memory of the terminal, wherein after generating the hash data chain, the hash function deletes the iris image information used as a variable to seed the hash function from the memories of the terminal and the server;

wherein after authentication is performed, hash data following the i-th hash data in the hash data chain is deleted from the memory of the terminal to prevent the deleted hash data from being used as a single-use password in a future authentication with the server, and wherein hash data that precedes the i-th hash data in the hash data chain is maintained within the memory of the terminal for subsequent use as another single-use password.

10. The authentication device according to claim 9, wherein Fourier transformation or wavelet transformation are applied to generate an iris image template from the iris image information, and wherein the iris image template is used as the seed to the hash function.

11. The authentication device according to claim 9, wherein a whole iris image is not used as the seed image but only those pixels in a certain sub-region of the iris image information which includes the biometric characteristic of the user.

12. The authentication device according to claim 9, wherein the single-use password is encoded in order to improve security of the authentication device, and the encoded single-use password is decoded at the server.

13. The authentication device according to claim 9, wherein, to determine whether a hash data H_i transmitted from the terminal is a user's single-use password, the server applies at least once the hash function to H_i; when the hash data of the hash function matches H_n stored in the server, the server determines that H_i is a user's single-use password.

14. The authentication device according to claim 13, wherein both the terminal and the server update the existing hash data when the single-use passwords are matched with each other and approval is given; and updating is performed whenever approval is given, or limited by a preset update frequency in consideration of a burden on the terminal and the server.

15. The authentication device according to claim 13, wherein the hash data is updated based on the iris image information photographed for authentication.

16. An authentication device using a single-use password, comprising:
- a smart card which stores single-use passwords generated from iris image information, wherein the single-use password comprises at least a hash data chain generated by a hash function and optionally one of the combinations of iris image information and support identification (ID), wherein a portion of the iris image information relevant to a biometric characteristic of a user is used to seed the hash function when generating the plurality of single-use passwords;
- a support provided with a camera for photographing second iris image information for authentication and with a smart card reader; and
- a server that stores the iris image information for authentication in memory and has an embedded algorithm for determining whether a single-use password comprising an i-th hash data in the hash data chain transmitted from the support matches the single-use password stored in the server, and wherein in the hash data chain of the hash function, a n-th hash data H_n is stored in the memory of the server and another n−1 hash data are stored in the memory of the smart card,
- wherein, after generating the hash data chain, the hash function deletes the iris image information used as a variable to seed the hash function from the memory of smart card;
- wherein hash data is deleted from the smart card following authentication with the i-th hash data in the hash data chain from the smart card to prevent the deleted hash data from being used as a single-use password in a future authentication, and wherein hash data that precedes the i-th hash data in the hash data chain is maintained within the smart card for subsequent use as another single-use password.

17. The authentication device according to claim 16, wherein Fourier transformation or wavelet transformation are applied to generate iris image template from the iris image information, and wherein the iris image template is used as the seed to the hash function.

18. The authentication device according to claim 16, wherein a whole iris image is not used as the seed, but only those pixels in a certain sub-region of the iris image information which include the biometric characteristic of the user.

19. The authentication device according to claim 18, wherein the smart card encodes the single-use password and transmits the encoded single-use password to the server, and the server decodes the encoded single-use password.

20. The authentication device according to claim 16, wherein, to determine whether a hash data H_i transmitted from the smart card is a user's single-use password, the server applies at least once the hash function to H_i; when the hash data of the hash function matches H_n stored in the server, the server determines that H_i is a user's single-use password.

21. The authentication device according to claim 20, wherein the hash data is updated based on the iris image information photographed for authentication.

* * * * *